United States Patent [19]

Johnson

[11] 4,348,079
[45] Sep. 7, 1982

[54] ACOUSTO-OPTIC DEVICE UTILIZING FRESNEL ZONE PLATE ELECTRODE ARRAY

[75] Inventor: Richard V. Johnson, Pasadena, Calif.

[73] Assignee: Xerox Corporation, Stamford, Conn.

[21] Appl. No.: 138,629

[22] Filed: Apr. 8, 1980

[51] Int. Cl.³ .............................................. G02F 1/11
[52] U.S. Cl. .................................................. 350/358
[58] Field of Search ....................................... 350/358

[56] References Cited
U.S. PATENT DOCUMENTS 4,169,662 10/1979 Kaule et al. ...................... 350/358

Primary Examiner—William L. Sikes
Attorney, Agent, or Firm—Franklyn C. Weiss

[57] ABSTRACT

A Fresnel zone plate lens in the form of a plurality of electrodes is provided on the transducer surface of a Bragg acousto-optic device (modulator or deflector). The thickness of the electrodes decrease away from the center electrode, the spacing between electrodes also decreasing as the electrodes are spaced from the center electrode. One end of each electrode in the electrode is connected to common the other end of each electrode being connected to a voltage level in a manner such that the voltage applied to adjacent electrodes are 180° out of phase.

5 Claims, 2 Drawing Figures

ACOUSTO-OPTIC DEVICE UTILIZING FRESNEL ZONE PLATE ELECTRODE ARRAY

BACKGROUND OF THE INVENTION

1. Field of the Invention

The present invention relates to the field of acousto-optic modulators and deflectors and, in particular, the use of an acoustic Fresnel zone plate to reduce the transducer power density.

2. Description of the Prior Art

The sound field profile generated in prior art acousto-optic modulators by the typical flat, rectangular transducer utilized therewith is not optimized for operation at high acousto carrier frequencies.

As noted in the article entitled "A Review of Acoustooptical Deflection and Modulation Devices", Proc. IEEE Vol. 54, No. 10, Oct. 1969, pgs. 1391-1401 by E. I. Gordon, power loading of the transducer and acoustic medium can be avoided by operating in the far field of the acoustic beam, that is, by placing the nominal beam focus or waist outside the transducer. However, with the flat transducer, the beam waist occurs at the transducer.

The nominal beam focus or waist can be placed outside the acoustic medium by the use of cylindrical transducers, which produce cylindrically focused beams, or by the use of acoustical mirrors. An article by M. G. Cohen et al, "Focusing of Microwave Acoustic Beams", Journal of Applied Physics, Volume 38, No. 5, April, 1967, pgs. 2340-2344, describes techniques for focusing a sound field which include deposition of a thin film transducer on a curved surface and the use of an acoustical mirror. Neither technique is satisfactory because thin film transducers have notoriously low efficiency and curved surfaces require more labor to fabricate than flat surfaces.

The power density at the transducer of an acousto-optic device has been determined to be proportional to the fourth power of the acoustic carrier frequency if the transducer is flat and a single element. Since high performance requires high carrier frequencies, extremely high power densities are required in the transducer. The power density at the transducer can be reduced by providing an array of flat transducers. However, it is necessary to focus the acoustically wide, low intensity beam into a narrow, high intensity beam.

Y. Ohta et al, in an article entitled "Improved A-O Modulator for Wideband Laser Recording System", Electro-Optical Systems Design, February, 1979, pgs. 26-29, discloses an acousto-optic modulator having a single flat rectangular transducer bonded by indium, five electrodes on the transducer upper face having a predetermined length and interelectrode spacing. Each transducer element is driven by an electric field having predetermined relative amplitudes. The amplitude and phase distribution of the acoustic wave at the transducer produced by the Ohta et al device results in the broadening of the diffracted light intensity distribution which is necessary for high performance scanning applications.

SUMMARY OF THE PRESENT INVENTION

The present invention provides a novel apparatus and method for focusing a sound field in a Bragg acousto-optic device. In particular, a Fresnel zone plate lens is fabricated on one surface of the Bragg acousto-optic device (modulator or deflector) in the form of high efficiency, electrode elements bonded onto a flat surface of the device, the power density at the transducer thereby being significantly reduced in the embodiment in a first embodiment of the invention, the light throughput efficiency of the device being substantially improved in a second embodiment of the invention.

It is an object of the present invention to provide a novel Bragg acousto-optic device.

It is a further object of the present invention to provide a novel method of focusing a sound field in a Bragg acousto-optic device having a plurality of substantially flat, rectangularly shaped electrodes formed on one surface of the device transducer.

It is still a further object of the present invention to provide a novel Bragg acousto-optic device wherein a plurality of substantially flat, rectangularly shaped electrode elements are formed on one surface of device transducer, the electrodes being formed as a Fresnel zone plate lens whereby the power density at the transducer of the device is reduced in one embodiment, the light throughput efficiency of the device also being substantially improved in a second embodiment of the invention.

It is a further object of the present invention to provide a Bragg acousto-optic device wherein the power density at the transducer is substantially reduced at high carrier frequencies thereby allowing the use of relatively inexpensive glass as the acousto-optic medium instead of relatively expensive single crystal material.

DESCRIPTION OF THE DRAWINGS

For a better understanding of the invention as well as other objects and further features thereof, reference is made to the following description which is to be read in conjunction with the accompanying drawings wherein.

DESCRIPTION OF THE PREFERRED EMBODIMENTS

Figure 1:
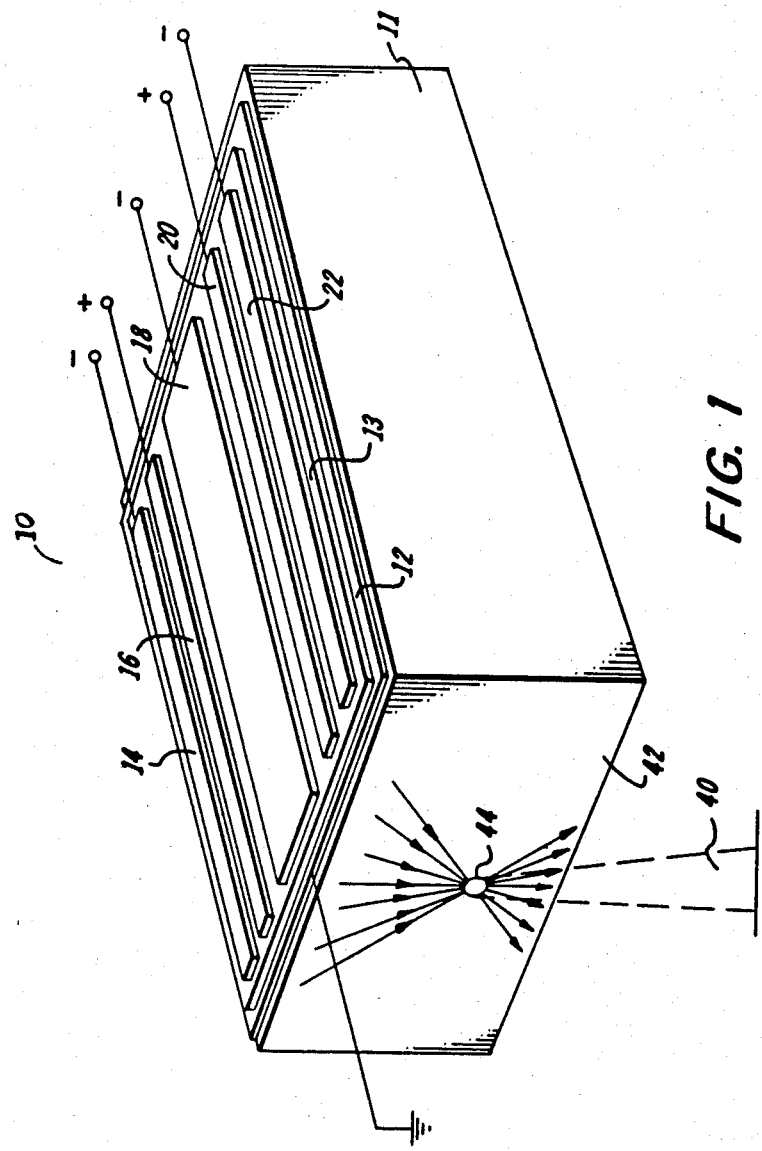
FIG. 1 is a perspective view of one embodiment of the acousto-optic device of the present invention wherein power density at the transducer is reduced.

Referring to FIG. 1, one embodiment of the Bragg acousto-optic device 10 (modulator or deflector) of the present invention is illustrated wherein the power density at the transducer is substantially reduced. Device 10 preferably comprises a glass acousto-optic medium 11, such as the dense Schott SF8 flint glass commercially available, a metal, electrical ground layer 12, a lithium niobate crystal layer 13 and a pattern of metal electrode elements 14, 16 . . . 22.

Recently developed laser scanning devices utilizing acousto-optic devices for the modulator or deflector have provided for higher performance (higher frequency electronic signals) by reducing the dimensions (height and length) of the transducer element. However, reduced size increases the power dissipation in the transducer which in turn may cause thermally induced optical distortion problems therein and eventual failure of the device. The present invention allows relatively inexpensive glass to be used as the acousto-optic medium instead of expensive single crystal materials such as tellurium dioxide.

A technique for reducing power dissipation in the transducer layer 13, according to the present invention, is to split the conventional single driving electrode into the array of electrodes 14, 16 . . . 22, as shown in the figure such that the power dissipated is divided among a plurality of electrodes instead of being concentrated in a single electrode (three to five electrodes is the preferred number of electrodes). In order to avoid a sound energy pattern which would be distributed over a relatively large area that would not optimally interact with the incident light beam which would be produced by the electrode array, the electrode array is formed as a Fresnel zone plate arrangement on one surface of the device whereby a focused cone of sound energy is produced simply and efficiently.

A Fresnel zone plate, as known in the field of optics, is simply a mask with a sequence of alternately transparent and opaque annuli, or zones, the radii being chosen such that the transmitted radiation will constructively interfere at some predetermined point (the primary focus). A positive (negative) zone plate is defined as having a transparent (opaque) central zone. In order to realize an equivalent zone plate for the purposes of the present invention, it is necessary to excite the electrode in the regions corresponding to the transmissive zones of the zone plate pattern. This is accomplished by using photolithographic techniques to evaporate a zone plate pattern as a linear array of electrodes 14, 16 . . . 22 on one surface of layer 13.

It has been determined that in order to provide a well defined focused cone of acoustic energy, one end of the electrode array is coupled to the common (typically ground) 12 and the other ends of the transducers are coupled to voltage sources in a manner such that the total power applied to the electrode elements is in the range from about 1 to about 3 watts, the voltage applied to one electrode element (electrode) being 180° out of phase with the next adjacent electrode. It should be noted that acousto-optic device configuration described allows high carrier frequencies to be utilized (typically in the range from about 25 MHz to about 150 MHz) and also enables glass to be utilized as medium 11. Further, and in accordance with standard Fresnel zone plate optic techniques, electrodes 14, 16 . . . 22 are configured such that the center electrode 18 has the largest length (typically 3.0 millimeters); the next adjacent electrode 16 and 20 have a smaller length (typically 2.0 millimeters) and the furthest electrodes 14 and 22 are the smallest lengths (typically 1.5 millimeters). In a similar manner, the spacing between electrodes decreases away from the center electrode 18. For example, the spacing (gap) between electrodes 16 and 18 and electrodes 18 and 20 is typically 0.5 millimeters; the spacing between electrodes 14 and 16 and electrodes 20 and 22 is typically 0.25 millimeters. Although only five electrodes are shown to comprise the array, it should be noted that additional electrodes may be added to the array. The transducer layer 13 typically comprises lithium niobate as set forth hereinabove.

As illustrated, a beam of light 40, such as that generated by a laser, is incident on surface 42 of device 10 at the Bragg angle (the term is well-known in the field of acousto-optic devices), the acoustic energy being focused in a manner such that the primary focus occurs at spot 44 which is substantially coincident with the area at which beam 40 is incident on surface 42.

Figure 2:
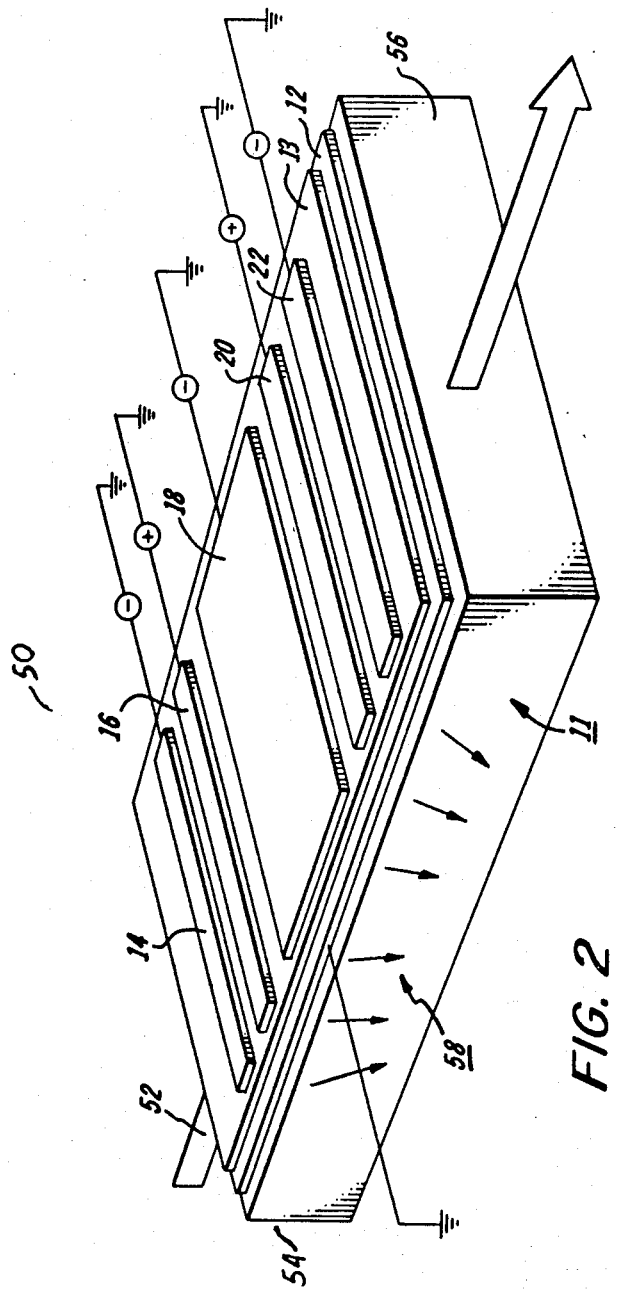
FIG. 2 is a perspective view of a second embodiment of the acousto-optic device of the present invention wherein power density at the transducer is reduced and the light throughput efficiency of the device is substantially improved.

FIG. 2 is a second embodiment of the invention, similar to the first, wherein the light beam is incident on the acousto-optic device in a manner such that the acousto-optic coupling is also optimized. It should be noted that identical reference numerals utilized in each figure identify identical components. In this embodiment, light beam 52 is incident on surface 54 of the device, light beam 52 exiting the device from surface 56. The electrodes 14, 16 . . . 22 are stretched out in the direction of the incident light beam in a manner such that the acoustic field 58 is not focused within the acousto-optic medium 12. However, light beam 52 is not required to be at the sound focus because of the build-up of the light/sound interaction as the light beam 52 traverses medium 12. In this embodiment, greater flexibility in the size and spacing of the electrodes is allowed as compared to the FIG. 1 embodiment due to the increased light/sound interaction as shown in the figure.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. In a laser scanning system including a Bragg acousto-optic device and a laser source directing a laser light beam through an acousto-optic medium within said Bragg device, the improvement of apparatus for focusing a sound field in said Bragg device, said improvement comprising:
    a Fresnel zone plate electrode array bonded to one surface of said medium, and
    means for driving each electrode of said array with a radio frequency voltage of sufficient magnitude to activate said acousto-optic device to modulate and/or deflect said laser light beam passing through said acousto-optic medium.

2. The device as defined in claim 1 wherein the voltage applied to said array has a carrier frequency in the range from about 25 MHz to about 150 MHz.

3. The device as defined in claim 2 wherein said medium comprises glass.

4. The device as defined in claim 3 wherein the voltages applied to adjacent electrodes of the array are 180° out of phase.

5. The device as defined in claim 1 wherein the length of the electrodes in said electrode array decreases away from a central electrode, the spacing between said electrodes also decreasing away from said center electrode.

* * * * *